United States Patent Office 2,876,121
Patented Mar. 3, 1959

2,876,121

ZIRCONIA RODS FOR COATING ARTICLES BY FLAME SPRAYING

Neil N. Ault, Holden, Mass., assignor to Norton Company, Worcester, Mass., a corporation of Massachusetts No Drawing. Application December 6, 1956
Serial No. 626,603

3 Claims. (Cl. 106—57)

The invention relates to zirconia rods for coating articles by flame spraying.

One object of the invention is to obtain uniform coatings on articles by the flame spraying process described in U. S. Letters Patent No. 2,707,691 to W. M. Wheildon, Jr., patented May 3, 1955. Another object of the invention is to provide superior zirconia rods for use in the process of the Wheildon patent. Another object is to provide rods which do not cause spitting.

Another object is to make rods for this flame spraying process which have greater thermal shock resistance. Another object is to make rods for flame spraying which will melt readily without spalling. Another object is to eliminate fracturing of such rods during flame spraying, previous rods having sometimes completely fractured resulting in the ejection of considerable lengths of white hot rods from the gun. These have burned people.

Other objects will be in part obvious or in part pointed out hereinafter.

I have discovered that a coarse grained rod sprays uniformly in the gun and is superior to a fine grained dense rod even though the strength of the fine grained dense rod is greater. For example, when a zirconium oxide rod is made from a mixture of 325 mesh and finer fused stabilized zirconia, extruded and fired to cone 35, a very strong, dense finely crystalline rod is obtained. Such a rod can be used for flame spraying but pieces of the rod which have not melted often break off and are projected by the compressed air blast onto the surface being coated. Such pieces may stick to the surface and cause a defect in the coating, or they may bounce off in which case they become hazards to people and property. The rate of feed of the rod and thus the spraying rate must also be kept low in order to use these dense rods. Even then this breaking off of pieces of rod (sometimes called spitting) will occur.

I have found that the use of coarse grained rods produced from coarse grained raw materials largely eliminates the hazards and produces better coatings. Rods made from 90 mesh and finer stabilized zirconia do not spit, but spray uniformly.

The preferred formula for the zirconia rods according to my invention is given in the following table:

TABLE I

| Material | Percent by Weight |
|---|---|
| Fused stabilized zirconia 90F grit size. 90 grit size is 216 microns size. This is ZrO₂ which has been fused in the electric furnace having from 3% to 6% of lime, CaO, in accordance with U. S. patent to Ballard and Marshall, No. 2,535,526, granted December 26, 1950. The preferred variety which I use contains 5% of lime | 75 |
| The same fused stabilized zirconia 90% of which is from 25 to 50 microns in size | 15 |
| Fused unstabilized zirconia having no added lime 90% of which is 25 to 50 microns in size | 10 |

The designation F after a number, which indicates the size of a screen in openings per linear inch, means that an under screen is not used and 75% of the material is finer than the indicated size down to impalpable fines.

Example I 100 weight parts of the material of Table I is mixed with 17 weight parts of water, 1 weight part of dextrine, and 2 weight parts of corn starch. After thorough mixing the resultant mixture is extruded thus forming rods. At present the rods are, after firing for which an allowance of 3% of the diameter is made for shrinkage, either one eighth of an inch in diameter or three sixteenths of an inch in diameter. The rods are then dried and after drying they are fired to cone 35, that is to say by placing them in a cone 35 kiln and thereby giving them the cone 35 heat treatment. Within the scope of my invention the firing could be anywhere from cone 20 to cone 42. The rods are then ready to be used in the process of the Wheildon patent.

Another formula which can be used according to my invention is given in the following table:

TABLE II

| Material: | Percent by weight |
|---|---|
| Fused stabilized zirconia with an average grit size of 200 microns | 54 |
| Stabilized zirconia with a grit size of 50 microns and finer | 46 |

Example II 100 weight parts of the material of Table II is mixed with 18 parts of water, 1 weight part of dextrine and 2 weight parts of corn starch. The rest of the procedure is the same as for Example I.

In accordance with my invention, another method for producing a structure with the desired porosity, is to include a material in the mixture which will burn out and leave pores in the rod where the material has burned out. Such material can be sawdust, walnut shells, coffee, or organic resins. Pores can also be introduced by materials which sublime such as paradichlorobenzene. With the pores artificially introduced in this manner, the size of the zirconia powder used can be similar to that of my preferred composition or it can be a very fine powder. Such a formula for producing a porous rod with fine stabilized zirconia powder is given in the following table:

TABLE III

| Material: | Percent by weight |
|---|---|
| Stabilized zirconia with a grit size of 25 microns and finer | 90 |
| Nut shells, 175 to 225 microns | 10 |

Example III 100 weight parts of the material of Table III is mixed with 20 weight parts of water, 1 weight part of dextrine, and 3 weight parts of corn starch. After thorough mixing the mixture is extruded thus forming rods. An allowance of 17% of the diameter is made for firing shrinkage when fired to cone 35. Since fine particles will sinter more readily, satisfactory rods of this mixture can be made by firing only to cone 14, but I prefer to fire them to cone 35 to make them stronger, so that they are easier to handle.

Rods according to my invention, besides being sintered zirconia rods, should have crystals the majority of which are selected from the group consisting of cubic crystals and tetragonal crystals. The reason for this is that when zirconia is either cubic or tetragonal, it has strong resistance to heat shock and I find that rods for flame spraying should have this property. Furthermore, the coating is preferably resistant to heat shock which is another reason for having the majority of crystals cubic or tetragonal. The firing of the rods sinters the particles together and the rods are therefore said to be sintered rods.

Zirconia having at room temperature all cubic crystals is fully stabilized and so is zirconia with all tetragonal crystals but within the scope of this invention, for many practical uses, a partially stabilized zirconia having up to 50% of monoclinic crystals (at room temperature) can be tolerated. One way of stabilizing zirconia is by fusing it with lime in accordance with the disclosure of the patent to my colleagues, Ballard and Marshall, mentioned in Table I. There are other ways of stabilizing zirconia, such as by fusing it with magnesia or with cerium oxide or with titanium monoxide, in varying proportions, but my invention is better defined by stating the crystal habit. When monoclinic crystals are heated to a certain temperature there is a sharp volume change which produces fractures on subsequent cooling, but this phenomenon is either absent or not so pronounced when the majority of the crystals are, originally, of the cubic or of the tetragonal variety.

All commercial zirconia used up to this time, with the exception of some for special purposes, has a minor content of hafnia, $HfO_2$. However, hafnia reacts chemically or fails to react with almost all other materials the same as zirconia. Furthermore, the hafnia content of zirconia is, except for certain special uses, reported as zirconia. Therefore, my rods are zirconia rods and they have, or they usually will have, a minor portion of hafnia. However the only detriment in the use of zirconia without hafnia is that it is expensive.

My rods resist splitting and are superior to prior rods if they have a porosity of from 8% to 40% of open interconnecting pores. These pores cut down the thermal conductivity which can lead to fracture and spitting. Rods according to my invention are not so strong as those heretofore existing but, and this is surprising, they are quite superior to the latter for flame spraying. They should have a minimum strength and they are satisfactory if they have a modulus of rupture (crossbending strength) of more than 2,000 pounds per square inch. My rods should be, apart from the hafnia content and apart from the stabilizing oxide content, for the stabilizing agents above mentioned are all oxides, at least 96% pure zirconia.

Material to make rods according to Examples I and II of this invention should be zirconia particles 30% by weight of which are coarser than 100 microns and substantially all of which are finer than 500 microns. As heretofore stated, the firing can be anywhere from cone 20 to cone 42 firing conditions, but I prefer to fire the rods under cone 35 conditions or thereabouts. In general, the higher firing temperatures produce stronger rods, but will also decrease the porosity, and furthermore, attaining the higher firing temperatures is expensive.

In stating that the zirconia apart from its hafnia content and the stabilizing oxide content is at least 96% pure zirconia, I have in mind that a minor proportion of iron oxide, say 1%, a small proportion of silica, say 2%, and a minor proportion of titania, say 1%, will not be so detrimental as to make an inferior rod for purposes of flame spraying. There might be other contaminants in the zirconia, provided all of them together don't add up to more than 4%. The hafnia and the stabilizing oxide are of course not contaminants, the former being completely compatible with the zirconia and the latter greatly improving it. I do prefer to have in most cases as small an amount of the contaminants as possible but some contamination cannot be avoided, as is the case with most compounds.

When used in flame spraying equipment, a rod is brought to the melting point at the tip in the flame, and a very high temperature differential is established between the molten end and the cool portion of the rod. This temperature differential causes differential expansion and thus high stresses near the molten tip of the rod. The dense, homogeneous, fine grained, strong rods break from these high thermal stresses. Small pieces shear off before they become molten, and are projected as solid particles rather than molten drops. These solid particles produce defects in the coating.

When the rod is coarse grained, it is more porous and has a lower mechanical strength. Fired dense zirconia rods have a crossbending strength of 16,000 pounds per square inch, while fired rods of the preferred composition shown in Table I have a crossbending strength of 8,000 pounds per square inch. These values for modulus of rupture were measured on ⅛" diameter rods which were supported on a 5" span, and loaded in crossbending at the center of the span. The bulk density of the dense rod is 5.2 grams per cubic centimeter while the bulk density of the preferred rod of Table I is 4.3 grams per cubic centimeter. The theoretical density of zirconia, $ZrO_2$, is 5.7 grams per cubic centimeter. All rods according to my invention contain pores of which more than 50 volume percent are more than 20 microns in diameter.

It will thus be seen that there has been provided by this invention zirconia rods for coating articles by flame spraying in which the various objects hereinabove set forth together with many thoroughly practical advantages are successfully achieved. As many possible embodiments may be made of the above invention and as many changes might be made in the embodiment above set forth, it is to be understood that all matter hereinbefore set forth is to be interpreted as illustrated and not in a limiting sense.

I claim:

1. A sintered zirconia rod for flame spraying to coat articles with zirconia whose composition is zirconia, the majority of the crystals of which are crystals selected from the group consisting of cubic crystals and tetragonal crystals, having a porosity of from 8% to 40% of open and interconnecting pores, having a modulus of rupture of more than 2,000 pounds per square inch, said zirconia apart from its hafnia content and apart from its stabilizing oxide content being at least 96% pure zirconia, said rod containing pores of which more than 50 volume percent are more than 20 microns in diameter, said rod having been made out of stabilized zirconia particles thirty percent by weight of which are coarser than 100 microns and said rod having been made out of zirconia particles substantially all of which are finer than 500 microns.

2. A sintered zirconia rod for flame spraying to coat articles with zirconia whose composition is zirconia, the majority of the crystals of which are crystals selected from the group consisting of cubic crystals and tetragonal crystals, having a porosity of from 8% to 40% of open and interconnecting pores, having a modulus of rupture of more than 2,000 pounds per square inch, said zirconia apart from its hafnia content and apart from its stabilizing oxide content being at least 96% pure zirconia, said rod having been made out of zirconia particles thirty percent by weight of which are coarser than 100 microns and said rod having been made out of zirconia particles substantially all of which are finer than 500 microns.

3. A sintered zirconia rod for flame spraying to coat articles with zirconia whose composition is zirconia, the majority of the crystals of which are crystals selected from the group consisting of cubic crystals and tetragonal crystals, having a porosity of from 8% to 40% of open and interconnecting pores, having a modulus of rupture of more than 2,000 pounds per square inch, said zirconia apart from its hafnia content and apart from its stabilizing oxide content being at least 96% pure zirconia, said rod containing pores of which more than 50 volume percent are more than 20 microns in diameter.

References Cited in the file of this patent

UNITED STATES PATENTS

| | | |
|---|---|---|
| 2,535,526 | Ballard et al. | Dec. 26, 1950 |
| 2,567,592 | Ballard | Sept. 11, 1951 |
| 2,707,691 | Wheildon | May 3, 1955 |